(12) United States Patent
Guerrero et al.

(10) Patent No.: US 9,910,931 B2
(45) Date of Patent: Mar. 6, 2018

(54) SUGGESTIVE INPUT SYSTEMS, METHODS AND APPLICATIONS FOR DATA RULE CREATION

(71) Applicant: Zendesk, Inc., San Francisco, CA (US)

(72) Inventors: Maurio Leon Guerrero, San Francisco, CA (US); Steven Kai-Mai Yan, San Francisco, CA (US); Amir Hadjihabib, Castro Valley, CA (US); Kurt Ruppel, San Francisco, CA (US)

(73) Assignee: Zendesk, Inc., San Francisco, CA (US)

( * ) Notice: Subject to any disclaimer, the term of this patent is extended or adjusted under 35 U.S.C. 154(b) by 586 days.

(21) Appl. No.: 14/219,738

(22) Filed: Mar. 19, 2014

(65) Prior Publication Data

US 2015/0268836 A1    Sep. 24, 2015

(51) Int. Cl.
*G06F 17/30* (2006.01)
*G06F 3/023* (2006.01)

(52) U.S. Cl.
CPC ........ *G06F 17/3097* (2013.01); *G06F 3/0237* (2013.01); *G06F 17/30398* (2013.01)

(58) Field of Classification Search
CPC ........... G06F 17/30401; G06F 17/3097; G06F 3/0237; G06F 3/0483; G06F 3/04842; G06F 3/04847
See application file for complete search history.

(56) References Cited

U.S. PATENT DOCUMENTS

| | | | | |
|---|---|---|---|---|
| 7,499,940 | B1 * | 3/2009 | Gibbs | G06F 17/30887 |
| 7,703,040 | B2 * | 4/2010 | Cutrell | G06F 17/30979 |
| | | | | 707/E17.014 |
| 2004/0254928 | A1 * | 12/2004 | Vronay | G06F 17/30401 |
| 2005/0066004 | A1 * | 3/2005 | Gan | G09B 21/009 |
| | | | | 709/206 |
| 2007/0168223 | A1 * | 7/2007 | Fors | G06F 19/324 |
| | | | | 705/2 |
| 2007/0208738 | A1 * | 9/2007 | Morgan | G06F 17/271 |
| 2008/0120102 | A1 * | 5/2008 | Rao | G10L 15/22 |
| | | | | 704/235 |
| 2009/0276417 | A1 * | 11/2009 | Shapira | G06F 17/30746 |
| 2010/0194690 | A1 * | 8/2010 | Wilairat | G06F 3/0233 |
| | | | | 345/168 |
| 2011/0113048 | A1 * | 5/2011 | Njemanze | G06F 7/02 |
| | | | | 707/755 |
| 2012/0016678 | A1 * | 1/2012 | Gruber | G06F 17/3087 |
| | | | | 704/275 |
| 2012/0060216 | A1 * | 3/2012 | Chaudhri | G06F 19/322 |
| | | | | 726/21 |
| 2012/0176310 | A1 * | 7/2012 | Nair | G06F 3/0213 |
| | | | | 345/157 |

(Continued)

*Primary Examiner* — Andrea Long
(74) *Attorney, Agent, or Firm* — Park, Vaughan, Fleming & Dowler LLP

(57) ABSTRACT

The present application describes a method for improving user experience with filtering information. A free text entry is received on a user interface of a computer. A navigation key entry is also received on the user interface. Next, it is determined whether the free text entry fulfills criteria for a field input. Further, information is filtered based upon the fulfilled field criteria and the received navigation key entry. The application also is directed to a system for improving user experience on an electronic device.

20 Claims, 17 Drawing Sheets

(56) References Cited

U.S. PATENT DOCUMENTS

| | | | | |
|---|---|---|---|---|
| 2012/0185498 | A1* | 7/2012 | Loofbourrow | G06F 17/30395 707/767 |
| 2013/0086067 | A1* | 4/2013 | Khoussainova | G06F 17/30646 707/737 |
| 2014/0244795 | A1* | 8/2014 | Hoffmann | G06F 17/27 709/219 |
| 2015/0026145 | A1* | 1/2015 | Prakash | G06F 17/30401 707/706 |
| 2015/0067640 | A1* | 3/2015 | Booker | G06F 8/33 717/109 |
| 2015/0161291 | A1* | 6/2015 | Gur | G06F 3/167 707/722 |

* cited by examiner

Title: High volume customers on Starter

Visibility: Agents

Filters:
User is Groupon, Box, Rockstar games, Sony Music
Location is within the United States
Plan is Starter
Some long field name here that does not equate some value, goes some more info, goes to next line Plan type is is
is not
is known
is unknown

Title High volume customers on Starter

Visibility Agents

Filters
User is Groupon, Box, Rockstar games, Sony Music
Location is within the United States
Plan is Starter
Some long field name here that does not equate some value, goes one more info, goes to next line Plan type is not
is not

FIG. 7

| | |
|---|---|
| Title | High volume customers on Starter |
| Visibility | Agents |
| Filters | User is Groupon, Box, Rockstar games, Sony Music |
| | Location is within the United States |
| | Plan is Starter |
| | Some long field name here that does not equal some value, goes now more info, goes to next line |
| | Plan type is not Silb |
| | "Silb" is not valid. Did you mean Silver |

FIG. 8A

Title: High volume customers on Starter

Visibility: Agents

Filters:
User is Groupon, Box, Rockstar games, Sony Music
Location is within the United States
Plan is Starter
Some long field name here that does not equate some value, goes now more info, goes to next line Plan type sdjfrsd
"sdjfrer" is not valid

Title
High volume customers on Starter

Visibility
Agents

Filters
User is Groupon, Box, Rockstar games, Sony Music
Location is within the United States
Plan is Starter
Some long field name here that does not equate some value, goes one more info, goes to next line Plan type is not Silver
Silver
Done

SUGGESTIVE INPUT SYSTEMS, METHODS AND APPLICATIONS FOR DATA RULE CREATION

BACKGROUND OF THE DISCLOSURE

1. Field of the Disclosure

The present application generally relates to systems, methods and applications for improving user experience with data retrieval. More specifically, the present application relates to methods, systems and application for controlling the display of data.

2. Related Art

The ability for a system or processor to deliver relevant search results to a query in an efficient manner is paramount in the twenty-first century. With users having increasingly less time available to structure focused searches, systems and processors have strived to improve their own architecture to locate relevant information requested or anticipated by a user. While the quality of the results may have improved, there have been significant reductions in efficiency.

Natural language text entry is used in many of today's search engines and recognized by systems and processors. Generally, a user freely types his or her query in a search box. The search engine attempts to understand the verbs, phrases and clauses to build a collection of results. Under the current available design architecture, challenges still exist for the system or processor to understand and recognize wide varieties of ambiguous input.

Other search engines employ keyword-based entry to search and retrieve information. That is, the system or processor may search a database for terms provided by the user. While keyword searching may be useful when the user is fairly confident with his or her search strategy the accuracy of the results may be compromised if one or more terms is not proper or not commonly used in the art.

What is needed in the art is a system, method and software application which improves efficiency with searching databases without compromising on the quality of the search hits.

What is also needed in the art is a system, method and software application that is easy to use and obtains relevant data with little time by the user to create a focused search.

What is further needed in the art is a system, method and software application that is user customizable.

SUMMARY OF THE INVENTION

The foregoing needs are met, to a great extent, by the present invention directed to a process, system and application for improving user experience with database searching.

One aspect of the application is directed to a computer-implemented method for improving user experience with filtering information. There is included a step of receiving a free text entry on a user interface. In addition, a navigation key entry is received on the user interface. Next, it is determined whether the received free text entry fulfills criteria for a field. Further, the information is filtered based upon at least the fulfilled field criteria and received navigation key entry.

Another aspect of the application is directed to a system for improving user experience with filtering information on an electronic device. The system includes a non-transitory member having instructions stored thereon for filtering the information. The system also includes a display for displaying a user interface. The system further includes a processor that is operatively coupled to the memory and the display. The processor is configured to perform the instruction of receiving a free text entry and a navigation key entry on the user interface. The processor is also configured to perform the instruction of filtering the information based upon the free text entry and the navigation key entry. Yet another aspect of the application is directed to a non-transitory computer readable storage medium storing computer-readable instructions for a software application for improving user experience with filtering on an electronic device, which when executed, causes the processor to perform the following steps. These steps include (i) displaying a user interface on a display of the electronic device; (ii) receiving a free text entry key and a navigation key entry on the user interface; (iii) determining whether the received free text entry fulfills criteria for a field; and (iv) filtering the information based upon at least the fulfilled field criteria and received navigation key entry.

There has thus been outlined, rather broadly, certain aspects of the application in order that the detailed description thereof herein may be better understood, and in order that the present contribution to the art may be better appreciated. There are, of course, additional aspects of the application that will be described below and which will form the subject matter of the claims appended hereto.

In this respect, before explaining at least one aspect of the application in detail, it is to be understood that the application is not limited in its application to the details of construction and to the arrangements of the components set forth in the following description or illustrated in the drawings. The application is capable of aspects or aspects in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the aspect is included in at least one aspect of the disclosure. The appearances of, for example, the phrases "an attribute" in various places in the specification are not necessarily all referring to the same aspect, nor are separate or alternative aspects mutually exclusive of other aspects. Moreover, various features are described which may be exhibited by some aspects and not by the other. Similarly, various requirements are described which may be requirements for some embodiments but not by other aspects.

As such, those skilled in the art will appreciate that the conception upon which this disclosure is based may readily be utilized as a basis for the designing of other structures, methods and systems for carrying out the several purposes of the application. It is important, therefore, that the claims be regarded as including such equivalent constructions insofar as they do not depart from the spirit and scope of the application.

BRIEF DESCRIPTION OF THE DRAWINGS

In order to facilitate a fuller understanding of the application, reference is now made to the accompanying drawings, in which like elements are referenced with like numerals. These drawings should not be construed as limiting the application and intended only to be illustrative.

FIG. 4 illustrates a display on an electronic device according to yet another embodiment.

FIG. 5 illustrates a display on an electronic device according to another embodiment.

FIG. 7 illustrates a display on an electronic device according to another embodiment.

FIGS. 8A and 8B illustrate a display with a correction feature according to another embodiment.

FIG. 9 illustrates a display on an electronic device according to even another embodiment.

FIG. 11 illustrates a display on an electronic device according to a further embodiment.

FIG. 12 illustrates a display on an electronic device according to a further embodiment.

FIG. 13 illustrates a display on an electronic device according to even further embodiment.

FIG. 15 illustrates a display on an electronic device according to even further embodiment.

DETAILED DESCRIPTION

In today's marketplace, it is important to equip users with the most versatile tools for efficiently searching databases for relevant information. In view of users' desires, the inventors of this application have proactively developed a novel technique for controlling the display of data. In particular, the architecture of the application recognizes syntactic nuances in natural language that is input by a user. The architecture employs logic to both recognize the user's intention and also in determining whether the user may progress to the next step. For example, the architecture may include at least a field, operator and value step discussed in more detail below. By so doing, a narrow filter is created for obtaining desired results. Thus, the user is relieved from indicating progression.

One aspect of the application is direct to a method, system and application for improving user experience and obtaining a focused search with accurate hits.

Another aspect of the application is direct to a method, system and application for accelerating the process for by which accurate search results are obtained.

Yet another aspect of the application is directed to a method, system and application for providing a user with versatility to search for information in a database.

It is to be understood that the system modules and method steps described in this application may be employed in various forms of hardware, software, firmware, special purpose processors or a combination thereof. Moreover, the technique may be a software application comprising executable code that is operably stored on one or more program storage devices including but not limited to a magnetic floppy disk, RAM, ROM, CD ROM and/or Flash memory.

Figure 1:
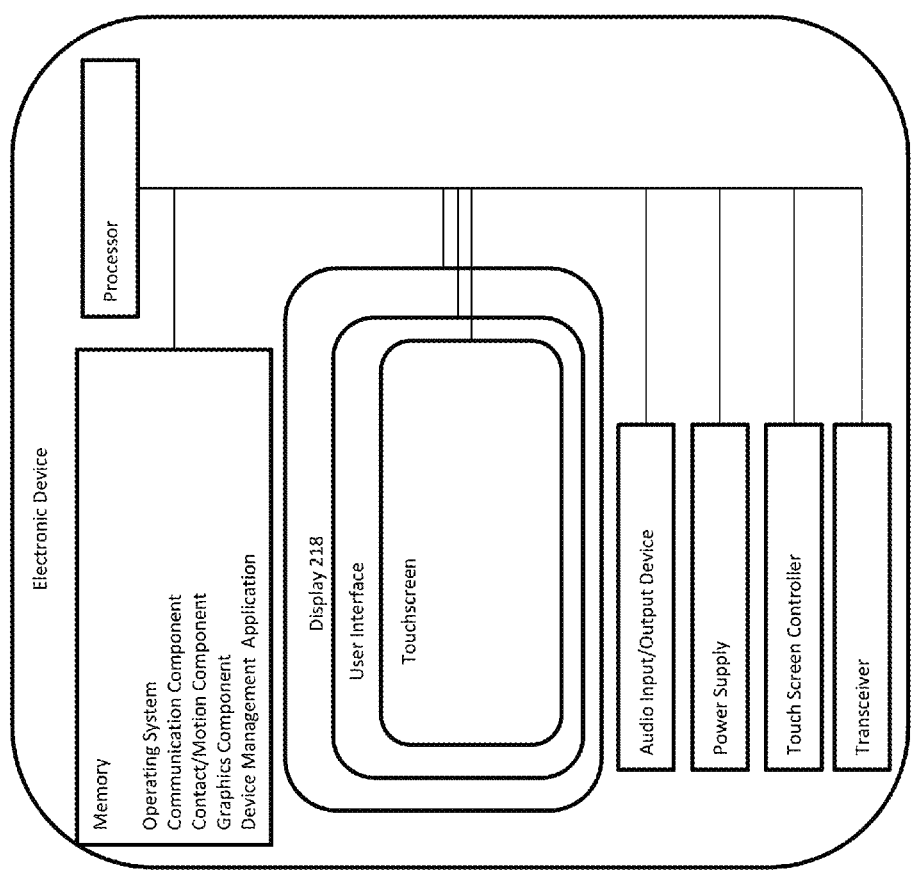
FIG. 1 illustrates an electronic device for displaying a search according to an embodiment.

FIG. 1 illustrates an example of an electronic device that may be employed by the user.

In an exemplary aspect, the electronic device includes a display. The display may be a liquid crystal display (LCD). Preferably the LCD includes a backlight to illuminate the various color liquid crystals to provide a more colorful display. The display may include a user interface that is made of any type of physical input as readily employed in the field. For example, the user interface may have physical buttons. Alternatively, the user interface may be implemented on a touchscreen.

In another embodiment, the user interface may be located independent of the display. In operation, the display may show various objects associated with applications for execution by the processor. For example, a user may touch the display, particularly the touchscreen, to interact with the objects. That is, touching an object may execute an application in the processor associated with the object that is stored in memory. Additionally or alternatively, touching an object may open a menu of options to be selected by the user. The display may include a plurality of objects for the user to interact with. Moreover the display may include a plurality of screens. The display showing one screen at a time. The user may interact with the display to move a screen into view on the display. Various objects may be located in each of the screens.

The touchscreen may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The display is generally configured to display a graphical user interface (GUI) that provides an easy to use visual interface between a user of the wireless device and the operating system or application(s) running on the wireless device. Generally, the GUI presents programs, files and operational options with graphical images. During operation, the user may select and activate various graphical images displayed on the display in order to initiate functions and tasks associated therewith. In another embodiment, the input device, may be a touch input device such as a keyboard, touchscreen, mouse, pen, or trackball, a voice input device, a scanning device, or another device that provides input to the computing environment. Some input/output devices, such as a touchscreen, may include both input and output functionality.

In another embodiment, the electronic device may include a memory for storing instructions. The memory of the wireless device may further include an operating system, a communication component, a contact/motion component, a graphics component and the like. The operating system together with the various components provides software functionality for each of the components of the wireless device. The memory may include a high-speed, random-access memory. Also, the memory may be a non-volatile memory, such as magnetic fixed disk storage, SIM, UICC, cloud-based memory, flash memory or the like. These various components may be connected through various communication lines including a data bus. The memory may be removable or non-removable. The memory is capable of storing computer-readable and executable instruction as will be discussed in more detail herein.

Moreover, the electronic device may include a processor that may be a central processing unit configured to execute instructions, such as, for example, instructions related to software programs. Any processor can be used for the electronic device as understood to those of ordinary skill in the art.

The electronic device may include an audio input/output device. The audio input/output device may include speakers, speaker outputs, and the like, providing sound output; and may include microphones, microphone inputs, and the like, for receiving sound inputs. In an exemplary aspect, the audio input/output device may include an analog to digital converter and a digital to audio converter for audio input and output functions respectively.

Figure 2:
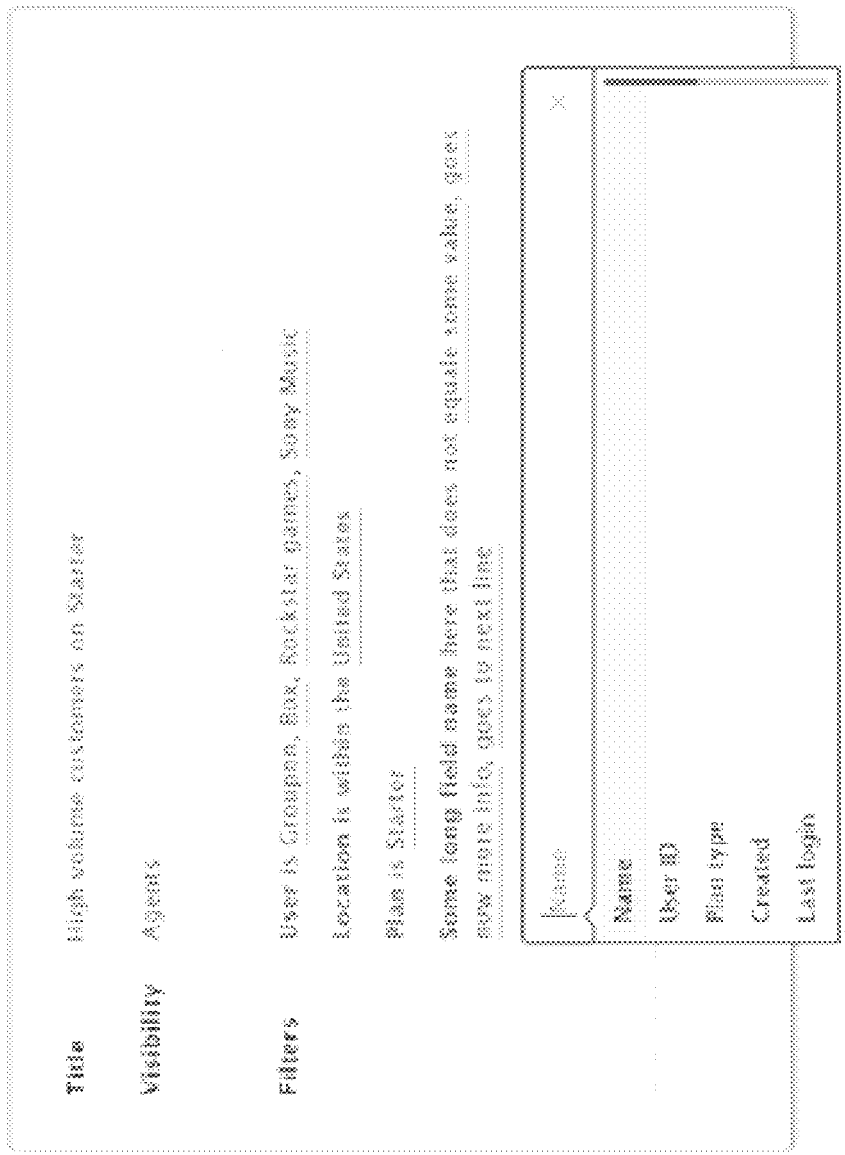
FIG. 2 illustrates a display on an electronic device according to an embodiment.

According to one aspect of the application, there is disclosed a method for improving user experience with controlling data display on an electronic device. The electronic device may include, for example, a computer, smartphone, tablet, or other device having a display. The user supplies free text entry into a search box as illustrated, for example, in FIG. 2. Free text entry for purposes of this application includes at least letters, numbers, characters and symbols commonly found on a keyboard. The user may also supply input via one or more navigation keys. For purposes of this application, navigation keys are different from free text entry keys. The navigation keys do not result in the display of a letter, number, character or symbol. The navigation keys may include, for example, ENTER, TAB, SPACE, ARROW LEFT and ARROW RIGHT. Depending upon the step of the method, the function of the navigation keys may change as shown in Table 1 below.

Figure 3:
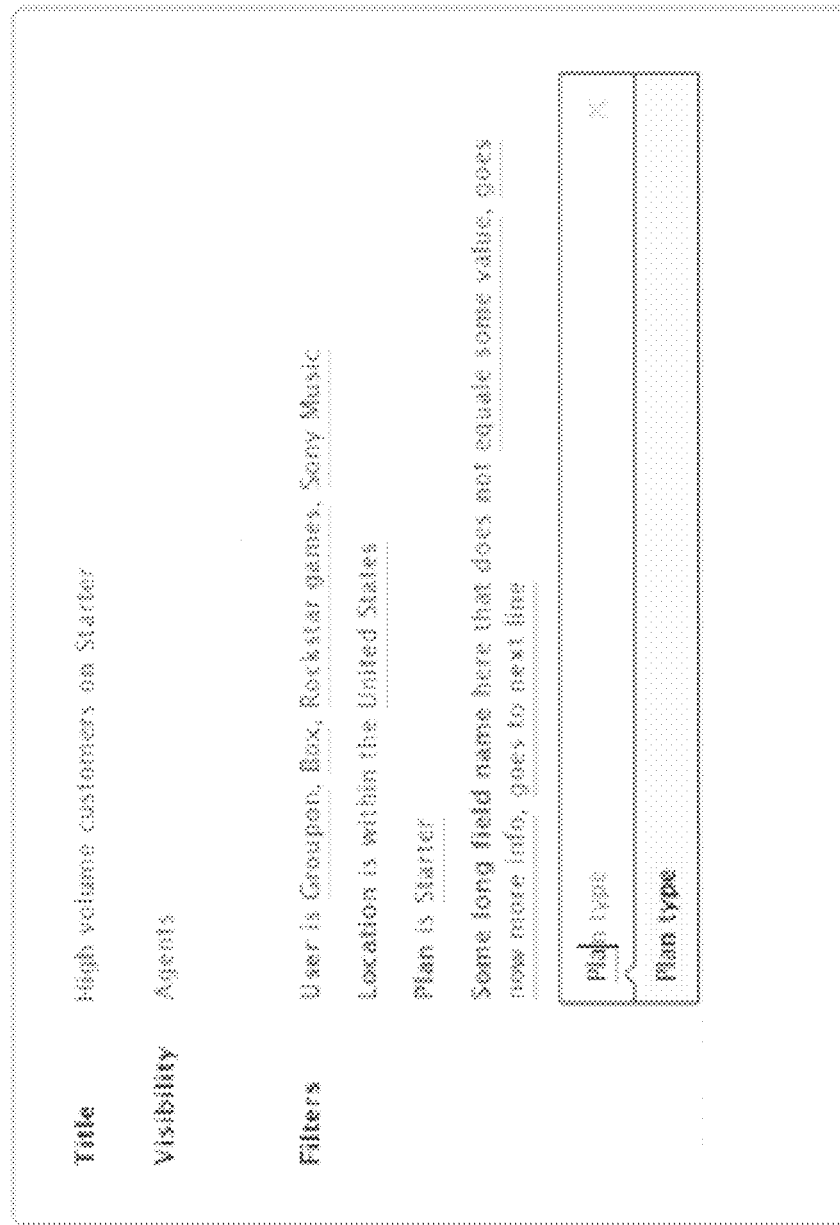
FIG. 3 illustrates a display on an electronic device according to another embodiment.

Here, the user types with free entry keys in order to begin the filtration process. As shown, some exemplary fields may include, but are not limited to, 'Name', 'User ID', 'Plan type', 'Created', 'Last Login', 'Language', 'Country', 'City', 'State', 'Zip Code', and 'Area Code'. FIG. 3 illustrates a display that is receiving free text entry from a user. As shown in FIG. 3, the user has input the letters 'PLa'. By so doing, the processor begins to filter the database to determine the FIELD. In one embodiment, after the user inputs the term 'Plan' and SPACE, the user continues to enter one or more alphanumeric characters. Thereafter, the processor determines whether these alphanumeric characters form a known FIELD, in combination with the first word. If not, the processor may assume the intention of the user is to continue to the OPERATOR step. The processor may then provide suggestions based upon which step—FIELD or OPERATOR—the user is currently in.

In another embodiment, the FIELD is narrowed to 'Plan type' as shown in FIG. 3. At this point, the user has a couple options assuming the FIELD denoted as 'Plan type' is desired. One option is for the user to input the remaining letters of 'Plan type'. Another option is to employ a navigation key, such as ENTER, TAB or ARROW RIGHT in order to automatically populate the remaining free text entries. In this example, the remaining free text entries would be 'n type' with a space input between the letters 'n' and T. By so doing, the FIELD populates as 'Plan type' faster than by manually entering the remaining free text entries. The completed field is indicated by the bold type in the search box as shown in FIG. 4.

For purposes of this application, the function of the SPACE key is to assume that a multi-term field name will be employed for the field. The processor, or application with computer-executable instructions, determines whether the one or more entries fulfill the criteria for a 'FIELD'. For example, if a multi-term FIELD is not recognized by the processor, the processor permits the user to proceed to the next step—selecting an OPERATOR—upon entering a SPACE. Moreover, ARROW LEFT functions as a deletion key to return to a zero state. For purposes of this application, a zero state is identified as a search query box without any entries.

Figure 4:
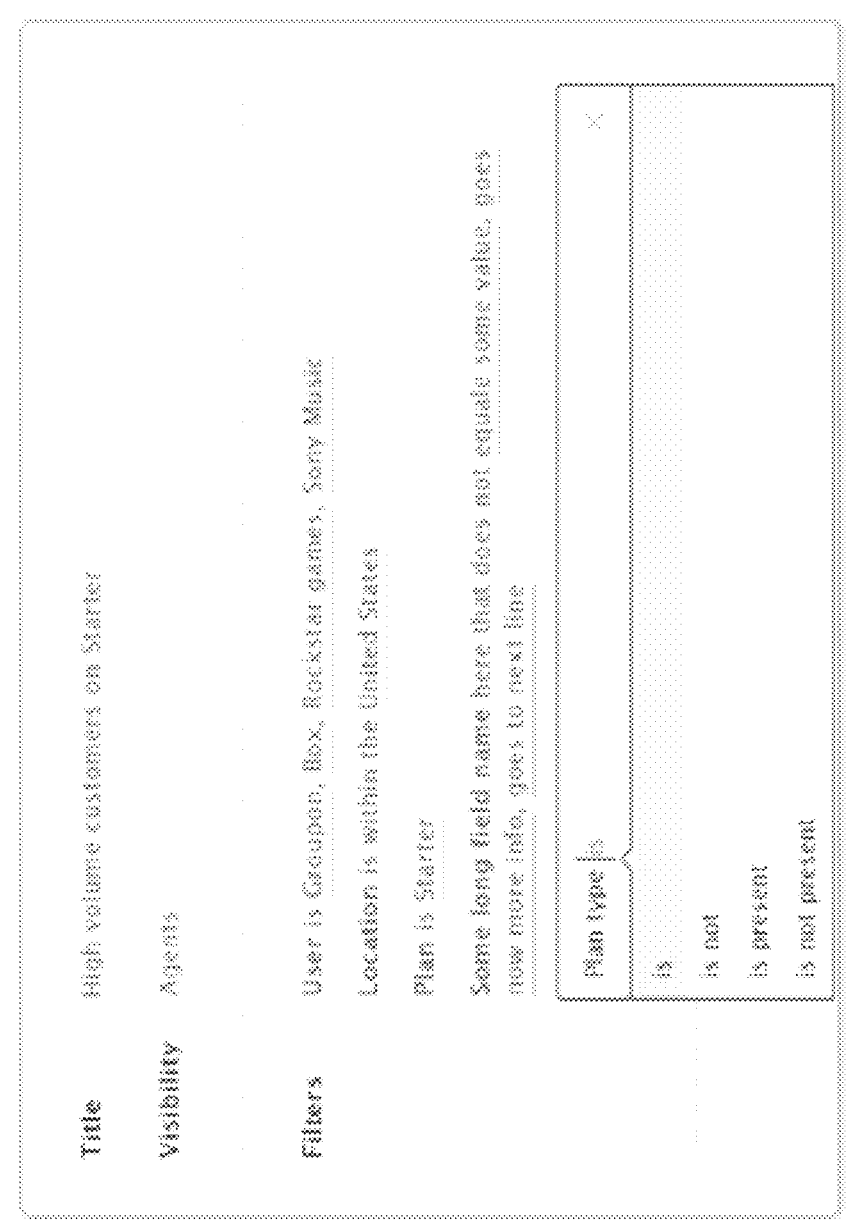

Next, the user is able to input an OPERATOR, such as for example, 'is', 'is not', 'is known' and 'is unknown' as one of the options as illustrated in FIG. 4. Moreover, the search box in FIG. 5 illustrates the user gas having input the term 'is' denoted by an underline. The input may either be done manually or with the aide of navigation keys. In the latter, for example, the user may employ the ARROW RIGHT, TAB or ENTER keys to select a frosted, e.g., different font type, OPERATOR appearing in the search box as shown in FIG. 4. By either typing the term 'is' or employing the navigation keys, the term 'is' appears in the search box in the same font type as the FIELD 'Plan type'.

Figure 6:
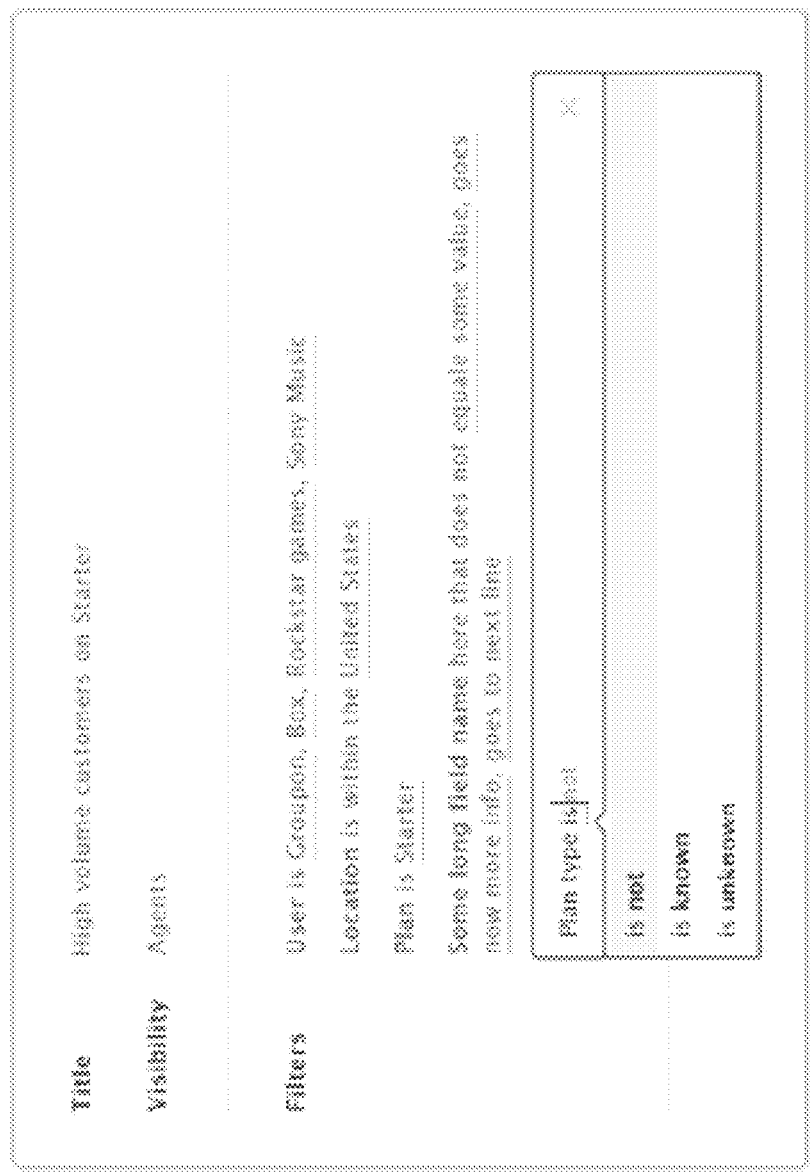
FIG. 6 illustrates a display on an electronic device according to another embodiment.

As shown in FIG. 6, plural options are provided to the user below the search box to complete the OPERATOR step. In this example, the user has input a SPACE after the term 'is'. The determination of whether the user intends to enter a multi-term OPERATOR is made after the next alphanumeric character or characters is entered by the user. In this case, the user has entered 'n'. By so doing, the phrase 'is not' may be presented to the user beneath the search box. An assumption is made that the user is still entering an OPERATOR. However, if the next alphanumeric character does not form a known OPERATOR, an assumption is made that the user intends to enter a VALUE. For example, if the user enters 'ne' after the SPACE, as assumption is made that a VALUE, such as for example, 'nebraska' is ultimately intended by the user.

FIG. 7, for example, illustrates the user selecting the OPERATOR 'is not'. As discussed above, the user may either manually input the second term of the OPERATOR 'not', or employ the navigation keys ENTER, TAB or ARROW RIGHT. Alternatively, the user may employ the ARROW LEFT key if so desired remove the OPERATOR terms displayed in the search box. Moreover, inputting the ARROW RIGHT key two times will clear the search box—no FIELD or OPERATOR—resulting in a zero state. In this instance, the user may start over again.

In another embodiment, the technique includes an error correcting features as shown in FIG. 8A. For example, upon the user inputting the phrase 'is not Sil' in the search box, the processor assumes the user intends to input a VALUE, such as for example, 'silver'. However, if the next character does not form a known phrase, such as for example, 'Plan type is not Silb', the processor assumes the last properly formed OPERATOR, e.g., 'is not', is valid, and that the VALUE, e.g., 'silb', is invalid. The processor, for example, conducts a spell-check and may also provide a suggestion. The processor may employ one or more metaphone phonetic algorithms to suggest similar sounding, alternative words, and can use correlation matrix memories (CM for distance-based comparison of terms.

In yet another embodiment as shown in FIG. 8B, the input is determined not to be valid. Here, the processor may be unable to provide alternative word choices since the user input appears to have no correlation to preceding terms. Nevertheless, it is envisaged in this application for the processor to provide some options, such as, for example, "Did you mean . . . " or " . . . is not valid".

In a further embodiment, the program recognizes whether free text and/or navigation key entries fulfill the criteria of the OPERATOR value. If, the program recognizes the OPERATOR, the user may then proceed to input a VALUE. Otherwise, the user will be held at the OPERATOR step until it is completed according to the requirements. Alternatively, the program may automatically clear the query box after a predetermined number of failed attempts.

Figure 9:
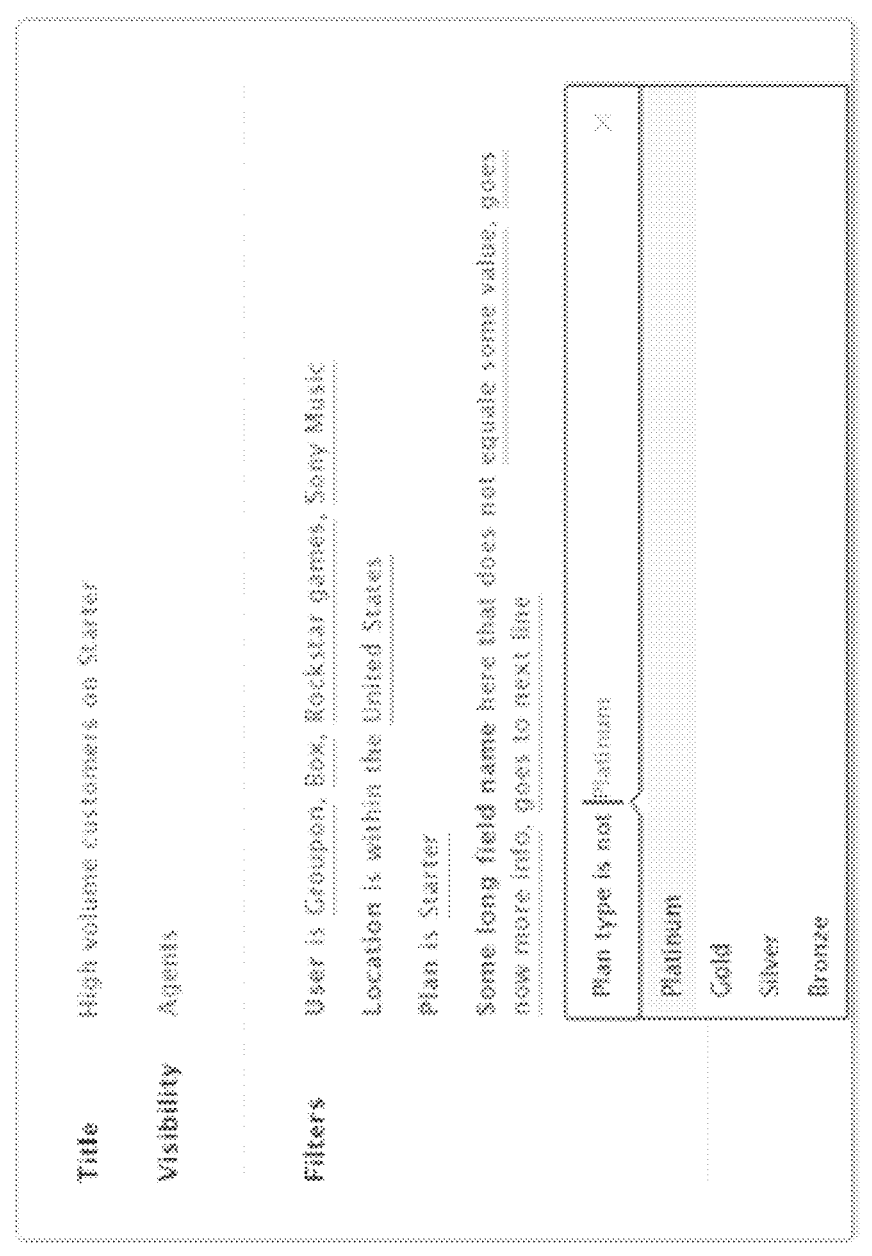
Figure 10:
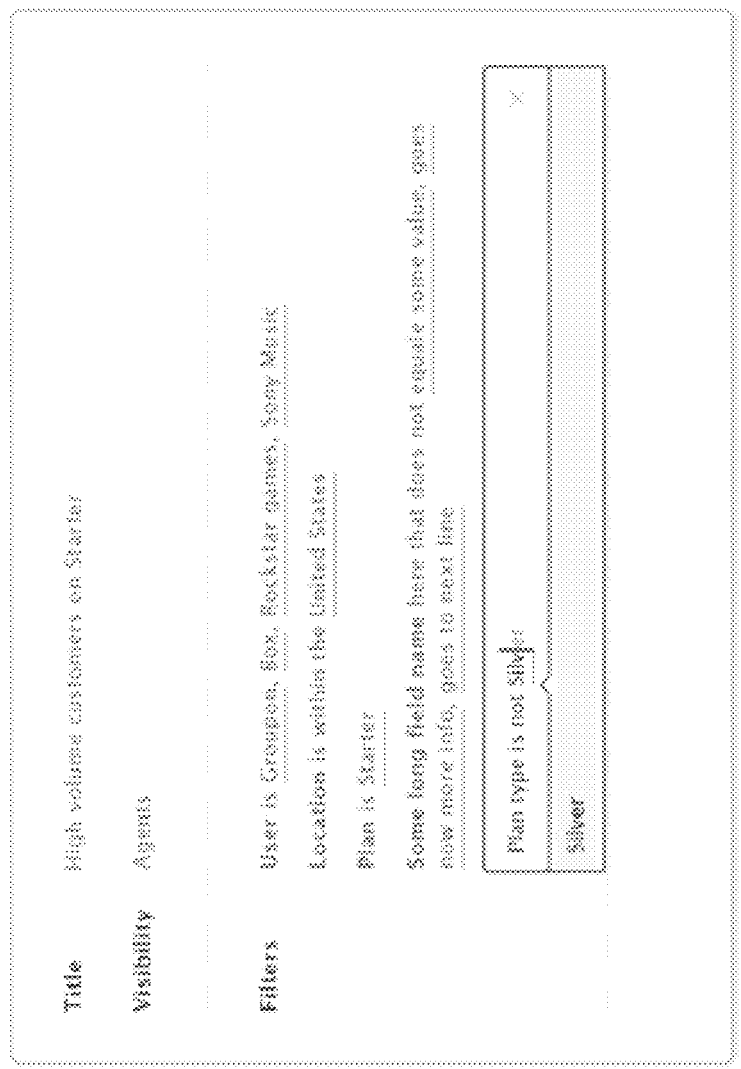
FIG. 10 illustrates a display on an electronic device according to yet even another embodiment.

As shown in FIG. 9, plural options for the VALUE are provided below the search box, such as for example, 'Platinum', 'Gold', 'Silver' and 'Bronze'. FIG. 10, illustrates an input of 'Silv' in the search box with the option of 'Silver' provided therebelow. As discussed above, the user may employ navigation keys such as ENTER, TAB or ARROW Right to expedite the entry of 'Silver', or alternatively, manually enter the remaining letters 'er' to complete the entry. The VALUE is underlined as depicted in FIG. 11. A completion icon may appear which allows the user to search the hits received by the FIELD-OPERATOR-VALUE inquiry.

As discussed above, the user may employ the ARROW LEFT key to clear the VALUE and return to the OPERATOR input. Selecting the ARROW LEFT key twice would return to the FIELD input. Selecting the ARROW LEFT key three times returns to a zero state, e.g., no FIELD, OPERATOR or VALUE terms in the search box.

In a further embodiment, employing the TAB or ARROW RIGHT keys, prior to inputting a real VALUE returns an assumption of Null. The focus is then placed upon the 'Done' or 'Completed' link. If the SPACE key is employed during the VALUE step by the user, the processor assumes a null selection, such as for example, 'Organization is None'. If the ARROW LEFT key is employed by the user, the user is returned to the OPERATOR step.

Figure 12:
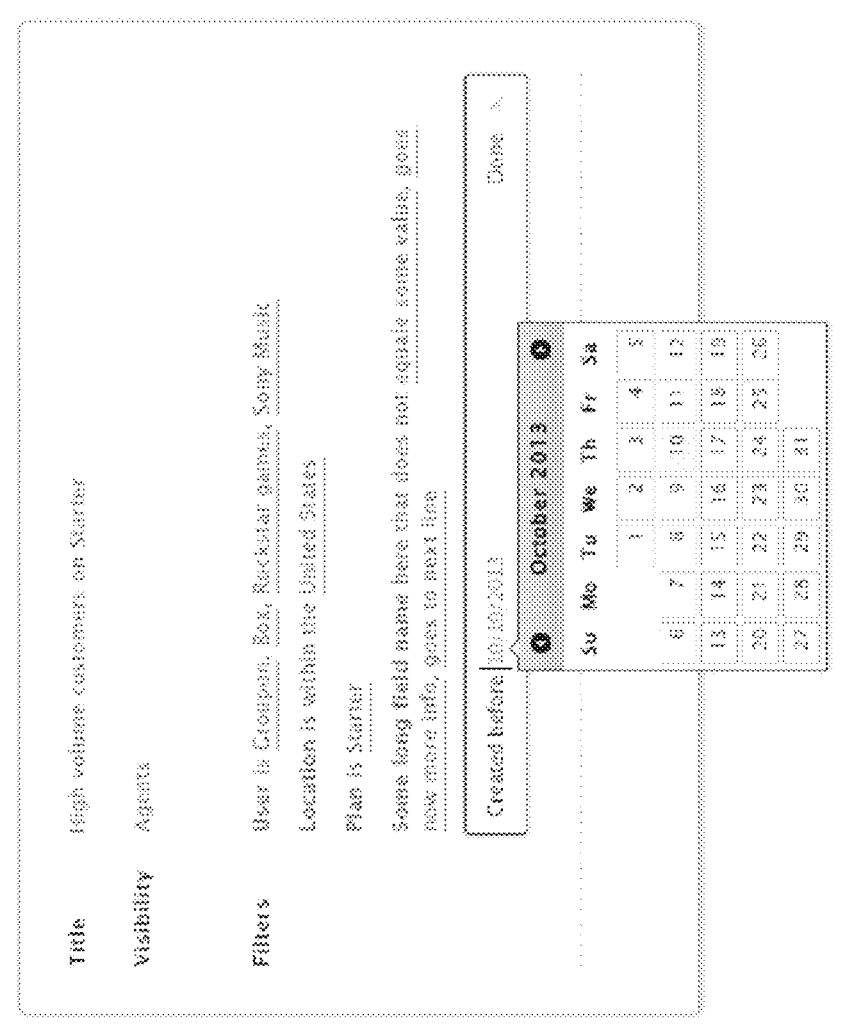
Figure 13:
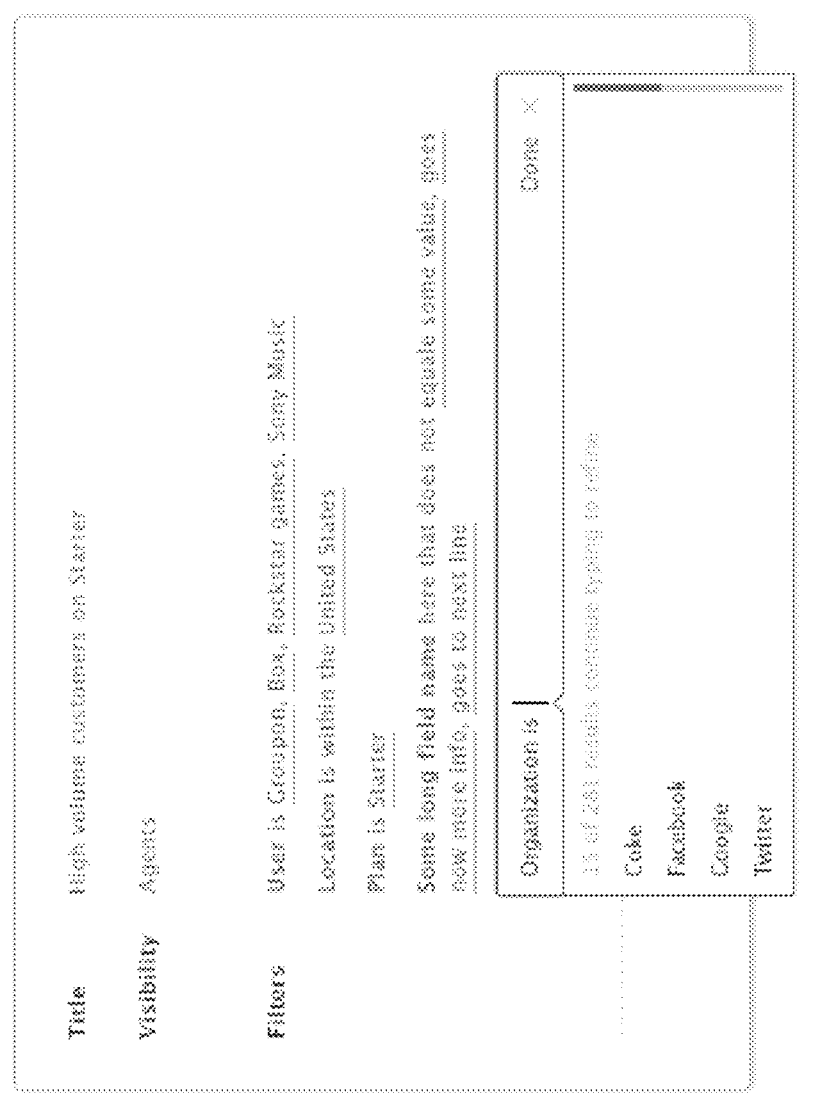

In yet another embodiment, the VALUE may be a date. For example, a calendar is provided which permits a user to select a date in the past as shown in FIG. 12. Upon selection of the date, an input thereof is displayed in the search box in month/date/year format. Other formats are envisaged in scope of the present application. If the display being employed is a touchscreen, the user can touch the date to populate the screen. If the screen is not touch screen, an auxiliary keyboard—touchpad or hard keys—may be employed by the user to make a selection. In yet another embodiment as shown in FIG. 13, the number of VALUES is provided to the user. For example, the user has the option of typing to further filter the results. On the other hand, the user can scroll through the list of values provided beneath the search box. By so doing, the user is empowered with the knowledge of how many VALUES appear in order to approximate how many hits may populate if no VALUES are selected.

Figure 14:
FIG. 14 illustrates a display on an electronic device according to even further embodiment.

In yet even another embodiment as shown in FIG. 14, the instructional text below the search box is provide. For example, "Name" is a text VALUE, "Description" is a multi-line text VALUE, and "Area Code" is a numeric VALUE.

Figure 15:
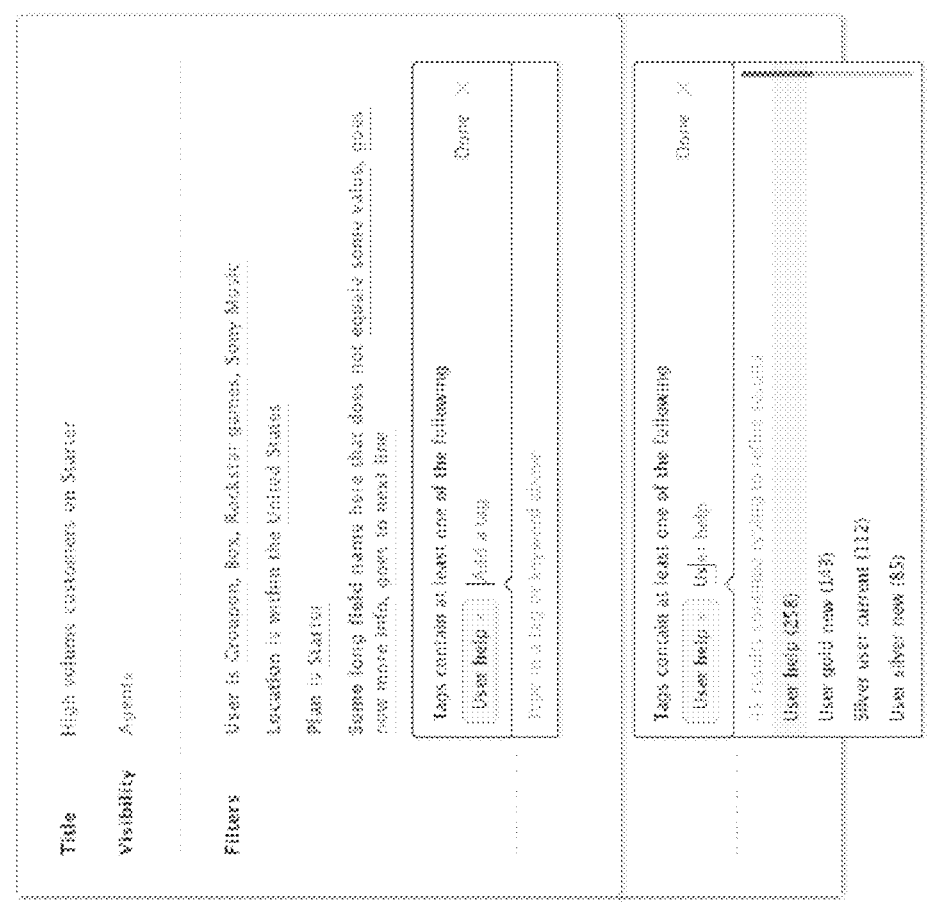

In a further embodiment, the user may create a new tag as illustrated in FIG. 15. For example, a value may be displayed in a GUI that creates a natural relation to the FIELD. Particularly, tags in Zendesk are shown framed in a gray background. Upon the user entering "Tags" as the FIELD, the VALUE entry appears in the same form as typical tags in Zendesk.

Figure 16:
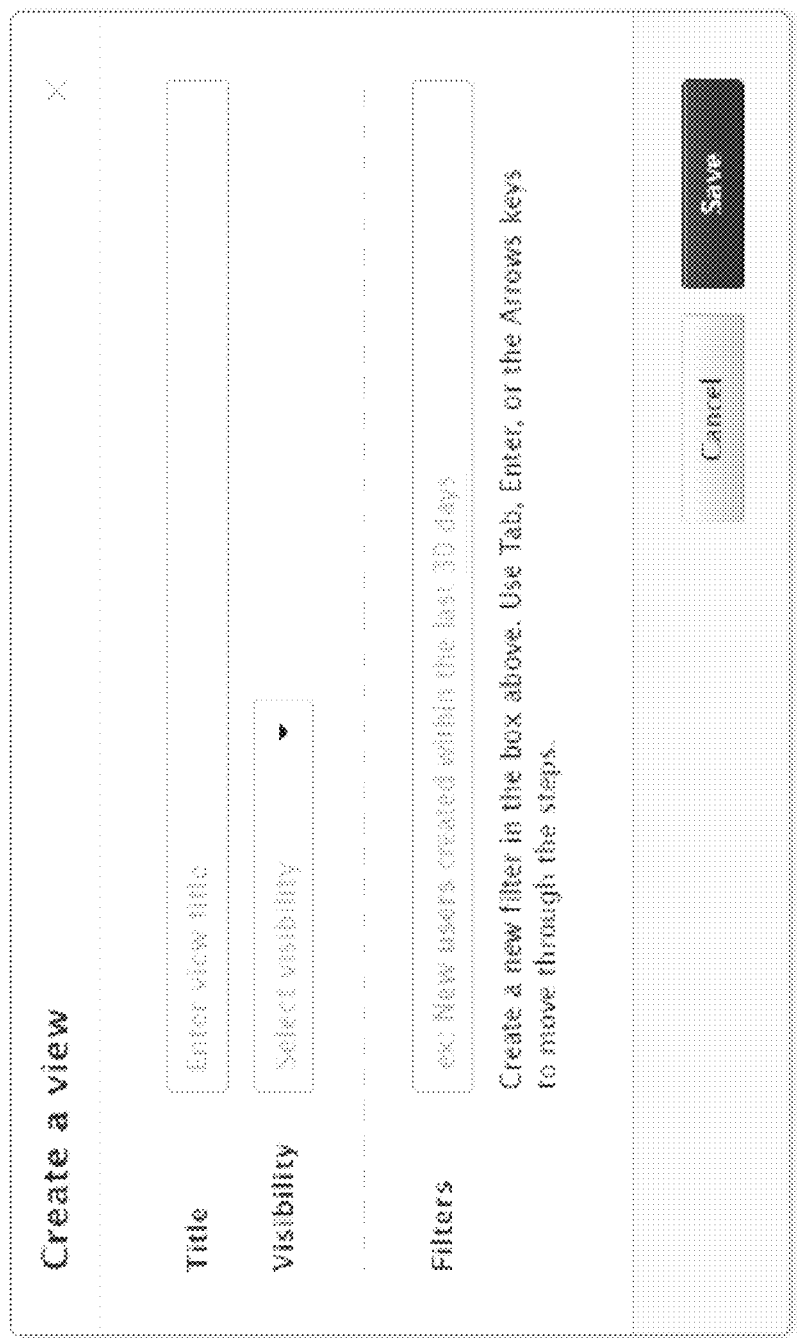
FIG. 16 illustrates a display on an electronic device according to yet even further embodiment.

The application further includes an embodiment of a feature for creating a view. The view, as shown in FIG. 16, includes a selection of a Title, Visibility and Filters.

TABLE 1

| Begin State | Key | Function | End State |
|---|---|---|---|
| FIELD | | | |
| Organization | ENTER | Select | Organization is |
| | TAB | Select | Organization is |
| | SPACE | A) Assumes multi-term field name. B) If none found, assumes Field + Operator. | A) Org Name \| B) Org is |
| | ARROW RIGHT | Select | Organization is |
| | ARROW LEFT | Clears, returns to zero state | [Empty] |
| OPERATOR | | | |
| Organization is | ENTER | Select | Organization is \| |
| | TAB | Select | Organization is \| |
| | SPACE | A) Assumes multi-term field name. B) If none found, assumes Field + Operator. | A) Organization is not B) Organization is \| |
| | ARROW RIGHT | Select | Organization is \| |
| | ARROW LEFT | Clears, returns to zero state | Organization\| |
| VALUE | | | |
| Organization is \| | ENTER | Assumes Null Selection | Organization is None |
| | TAB | Assumes Null selection and puts focus on "Done" link. | Organization is None |
| | SPACE | Assumes multi-term value | Organization is help desk |
| | Arrow Right | Assumes Null selection and puts focus on "Done" link. | Organization is None |
| | Arrow Left | Clears, returns to operator state | Organization is\| |

According to another aspect of the application, there is disclosed a system including a display, a non-transitory memory for storing instructions for controlling data display, and a processor configured to execute the instructions. The system may be an electronic device, such as, for example, a desktop computer, laptop, notebook, tablet smartphone and personal digital assistant. However, any electronic device including a processor may be employed within the contexts of this application. The system may also include an input device such as a keyboard, mouse, trackball, pen, touchscreen, etc. as necessary to input search criteria onto the user interface located on a display. Moreover, the processor is configured to perform the steps disclosed above. Specifically, the processor is operatively coupled to the memory and the display, the processor is configured to perform the instructions of: receiving a free text entry and a navigation key entry on the user interface; and filtering the information based upon the free text entry and the navigation key entry.

In yet a further aspect of the application, there is disclosed a non-transitory computer-readable or processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein.

The non-transitory computer-readable or processor-readable medium includes instructions stored thereon for a software application for improving user experience searching a database, which when executed, causes the processor to perform the following steps: (i) displaying a user interface on a display of the electronic device (ii) receiving a free text entry key and a navigation key entry on the user interface; (iii) determining whether the received free text entry fulfills criteria for a field; and (iv) filtering the information based upon at least the fulfilled field criteria and received navigation key entry. The stored instructions include, for example, those discussed above with respect to the method steps discussed earlier in this application.

In one or more aspects, the actions and/or events of a method, algorithm or module may reside as one or any combination or set of codes and/or instructions on a computer readable medium or machine readable medium, which may be incorporated into a computer program product. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device.

While the methods, systems and software applications have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A computer-implemented method for filtering information comprising:
   receiving a free text entry on a user interface, wherein the free text entry comprises a portion of a query;
   receiving a navigation key entry on the user interface, wherein a function of the navigation key is dependent on a context of the free text entry;
   when the navigation key entry is a space key, determining if there is at least one multi-term field name matching the free text entry;
   when there is at least one multi-term field name matching the free text entry, displaying on the user interface the matching multi-term fields for subsequent selection, and
   determining whether the received free text entry fulfills criteria for a field;
   filtering the information based upon at least the fulfilled field criteria and received navigation key entry; and
   when there is not at least one multi-term field name matching the free text entry, advancing to a next element of the query.

2. The method of claim 1, wherein the free text entry is received in natural language.

3. The method of claim 1, further comprising:
   receiving a second free text entry on the user interface; and
   recognizing whether the second free text entry fulfills criteria for an operator.

4. The method of claim 3, further comprising:
   receiving a third free text entry on the user interface; and
   ascertaining whether the third free text entry fulfills criteria for a value.

5. The method of claim 4, wherein the navigation key entry is received before the ascertaining step.

6. The method of claim 5, wherein the navigation key is received before the recognizing step.

7. The method of claim 6, wherein the navigation key is received before the determining step.

8. The method of claim 1, wherein the navigation key is selected from an enter key, a tab key, a space key, a right arrow key, a left arrow key and combinations thereof.

9. The method of claim 8, wherein the enter key, tab key and right arrow keys are prompts to complete text entries to display a word on the user interface.

10. The method of claim 8, wherein the space key is a prompt for a multi-term entry.

11. The method of claim 8, wherein the arrow left key is a prompt to clear the text entry in the user interface.

12. The method of claim 1, further comprising:
    checking for errors in the received free text entry.

13. A system for improving user experience with filtering information on an electronic device comprising:
    a non-transitory member having instructions stored thereon for filtering the information;
    a display for displaying a user interface;
    a processor, operatively coupled to the memory and the display, the processor configured to perform the instructions of: receiving a free text entry and a navigation key entry on the user interface, wherein the free text entry comprises a portion of a query, wherein a function of the navigation key is dependent on a context of the free text entry; when the navigation key entry is a space key, determining if there is at least one multi-term field name matching the free text entry; when there is at least one multi-term field name matching the free text entry, displaying on the user interface the matching multi-term fields for subsequent selection, filtering the information based upon the free text entry and the navigation key entry, and when there is not at least one multi-term field name matching the free text entry, advancing to a next element of the query.

14. The system of claim 13, wherein the electronic device is selected from a desktop computer, laptop, tablet, personal digital assistant and smartphone.

15. The system of claim 13, further comprising an input device selected from a keyboard, touchscreen, mouse, pen, trackball, voice input device and combinations thereof.

16. The system of claim 13, wherein the navigation key entry received on the user interface is selected from an enter key, a tab key, a space key, a right arrow key, a left arrow key and combinations thereof.

17. The system of claim 16, wherein the processor is further configured to recognize the enter key, tab key and right arrow key as prompts to complete text entries to display a word on the user interface.

18. The system of claim 16, wherein the processor is further configured to recognize the space key as a prompt for a multi-term entry.

19. The system of claim 16, wherein the processor is further configured to recognize the left arrow key as a prompt to clear the free text entry in the user interface.

20. A non-transitory computer readable storage medium storing computer-readable instructions for a software application for improving user experience with filtering information on an electronic device, which when executed, causes the electronic device to perform the following steps:
    (i) displaying a user interface on a display of the electronic device;

(ii) receiving a free text entry key and a navigation key entry on the user interface, wherein the free text entry comprises a portion of a query, wherein a function of the navigation key is dependent on a context of the free text entry;
when the navigation key entry is a space key, determining if there is at least one multi-term field name matching the free text entry;
when there is at least one multi-term field name matching the free text entry, displaying on the user interface the matching multi-term fields for subsequent selection, and
(iii) determining whether the received free text entry fulfills criteria for a field;
(iv) filtering the information based upon at least the fulfilled field criteria and received navigation key entry; and
when there is not at least one multi-term field name matching the free text entry, advancing to a next element of the query.

* * * * *

UNITED STATES PATENT AND TRADEMARK OFFICE
CERTIFICATE OF CORRECTION

| | | |
|---|---|---|
| PATENT NO. | : 9,910,931 B2 | Page 1 of 1 |
| APPLICATION NO. | : 14/219738 | |
| DATED | : March 6, 2018 | |
| INVENTOR(S) | : Maurio Leon Guerrero et al. | |

It is certified that error appears in the above-identified patent and that said Letters Patent is hereby corrected as shown below:

On the Title Page (72), the second named inventor's name is spelled incorrectly. Please change "Steven Kai-Mai Yan" to --Steven Kai-Man Yan--.

Signed and Sealed this
Twenty-ninth Day of May, 2018

Andrei Iancu
*Director of the United States Patent and Trademark Office*